US012350697B2

(12) United States Patent
Tobler et al.

(10) Patent No.: US 12,350,697 B2
(45) Date of Patent: Jul. 8, 2025

(54) POWDER DISPENSING DEVICE WITH A DILUTE PHASE POWDER PUMP

(71) Applicant: GEMA SWITZERLAND GMBH, St. Gallen (CH)

(72) Inventors: Roger Tobler, Herisau (CH); Marco Sanwald, Abtwil (CH); Felix Mauchle, Abtwil (CH)

(73) Assignee: GEMA SWITZERLAND GMBH, St. Gallen (CH)

( * ) Notice: Subject to any disclaimer, the term of this patent is extended or adjusted under 35 U.S.C. 154(b) by 763 days.

(21) Appl. No.: 17/291,965

(22) PCT Filed: Dec. 18, 2019

(86) PCT No.: PCT/EP2019/086031
§ 371 (c)(1),
(2) Date: May 6, 2021

(87) PCT Pub. No.: WO2020/136058
PCT Pub. Date: Jul. 2, 2020

(65) Prior Publication Data

US 2022/0001403 A1 Jan. 6, 2022

(30) Foreign Application Priority Data

Dec. 27, 2018 (DE) ......................... 102018133603.9
Jan. 25, 2019 (DE) ......................... 102019101930.3

(51) Int. Cl.
*B05B 5/03* (2006.01)
*B05B 5/053* (2006.01)
*B05B 5/16* (2006.01)

(52) U.S. Cl.
CPC ............ *B05B 5/032* (2013.01); *B05B 5/0533* (2013.01); *B05B 5/1683* (2013.01)

(58) Field of Classification Search
CPC ..... B05B 5/032; B05B 5/0533; B05B 5/1683; B05B 12/00; B05B 12/004; B05B 12/122;
(Continued)

(56) References Cited

U.S. PATENT DOCUMENTS 5,487,624 A * 1/1996 Toyota .................. B05B 12/085
406/14
2017/0216859 A1 * 8/2017 Mauchle ................ B05C 19/04

FOREIGN PATENT DOCUMENTS

DE 4405640 A1 8/1994
DE 102013218326 A1 3/2015
(Continued)

OTHER PUBLICATIONS

International Search Report and Written Opinion dated Apr. 15, 2020, for corresponding PCT Application No. PCT/EP2019/086031.

(Continued)

*Primary Examiner* — Christopher R Dandridge
(74) *Attorney, Agent, or Firm* — Kinney & Lange, P.A.

(57) ABSTRACT

A powder discharge device includes a powder thin flow pump for delivering powder, particularly coating powder, from a powder reservoir to a powder spray device, with a control device being integrated in the powder discharge device, which control device is designed to adjust at least one parameter, which is characterizing in relation to a spray coating process performed with the powder spray device and/or in relation to a powder delivery performed with the powder thin flow pump, the control device forming a structural unit with the powder thin flow pump.

19 Claims, 5 Drawing Sheets

(58) Field of Classification Search
CPC ......... B05B 5/025; B05B 5/0418; B05B 7/14; B05B 7/1472; B05B 7/1404; B05B 7/1459
See application file for complete search history.

(56) References Cited

FOREIGN PATENT DOCUMENTS

| | | | |
|---|---|---|---|
| DE | 102014215338 | A1 | 2/2016 |
| DE | 102017103316 | A1 | 8/2018 |

OTHER PUBLICATIONS

English translation of International Preliminary Report on Patentability dated Apr. 15, 2021, for corresponding PCT Application No. PCT/EP2019/086031.

* cited by examiner

POWDER DISPENSING DEVICE WITH A DILUTE PHASE POWDER PUMP

CROSS-REFERENCE TO RELATED APPLICATIONS(S)

This application is a Section 371 National Stage Application of International Application No. PCT/EP2019/086031, filed Dec. 18, 2019, entitled "POWDER DISCHARGE DEVICE WITH A POWDER THIN FLOW PUMP", which claims benefit of German Application Nos. 10 218 133 603.9, filed Dec. 27, 2018, and 10 2019 101 930.3, filed Jan. 25, 2019, all of which are incorporated by reference in their entireties.

BACKGROUND

The present disclosure relates to a powder dispensing device with a dilute phase powder pump for conveying powder, in particular coating powder, from a powder reservoir to a powder spraying device. The disclosure relates in particular to such powder dispensing devices and powder spray coating devices which comprise a dilute phase powder pump as a powder pump.

In the context of the present disclosure, dilute phase powder pumps are in particular injectors or respectively injector pumps, by means of which powder, particularly coating powder, is sucked into a conveying airflow and then, mixed with the conveying airflow, conveyed through a delivery line (powder supply line) to a powder spraying device. Such powder conveyance is also referred to in the present technical field as dilute phase powder conveyance.

Such a powder dispensing device for dilute phase powder conveyance is known for example from the EP 0 606 577 B1 or the U.S. Pat. No. 4,284,032 printed publication.

In contrast to dense phase powder conveyance, other circumstances apply with dilute phase powder conveyance since an injector is in this case used as a powder pump for conveying powder or coating powder respectively. A negative pressure is generated in the injector by means of a conveying or respectively transporting flow of air. Powder, coating powder respectively, is sucked into the compressed conveying airflow by means of the negative pressure. The mixture of compressed conveying air and powder then flows from the injector to for example a powder spraying device connected to the powder dispensing device. The amount of powder conveyed by the injector per unit of time is in particular dependent on the volume of transporting or respectively conveying air flowing through the injector per unit of time.

The present disclosure aims to solve the task of specifying a technical solution aimed at making the spray coating operation easier without the operator having to sacrifice good coating quality and good coating efficiency.

SUMMARY

Accordingly, in particular specified is a powder dispensing device having a dilute phase powder pump for conveying powder/coating powder from a powder reservoir to a powder spraying device, wherein a control device integrated into the powder dispensing device is provided which is designed to set at least one parameter which is characterizing with respect to a spray coating process effected with the powder spraying device and/or with respect to powder conveyance effected with the dilute phase powder pump, wherein the control device forms a structural unit with the dilute phase powder pump.

The at least one parameter which is characteristic with respect to a spray coating process effected with the powder spraying device is for example an electrode spray current from one or more high-voltage electrodes of the powder spraying device, a high voltage on one or more high-voltage electrodes of the powder spraying device, a volume of shaping air to be supplied to the powder spraying device per unit of time, a volume of electrode purge air to be supplied to the powder spraying device per unit of time, an amount of powder or coating powder respectively to be supplied to the powder spraying device per unit of time and/or a volume of compressed conveying air to be supplied to the powder spraying device together with the powder/coating powder per unit of time.

The at least one parameter characterizing a powder conveyance effected with the powder dispensing device is for example an amount of powder/coating powder to be conveyed by the powder dispensing device per unit of time and/or a volume of conveying air to be conveyed together with the powder/coating powder per unit of time.

Particularly preferentially provided is for the control device of the powder dispensing device to comprise at least one manually actuatable parameter setting element for setting a target parameter value for the at least one parameter which is characteristic with respect to a spray coating process effected with the powder spraying device and/or characteristic with respect to powder conveyance effected with the powder dispensing device. It is appropriate in this context for the control device to further comprise an optical display unit for automatically displaying the at least one set target parameter value and/or for automatically displaying at least one actual parameter value.

According to embodiments of the powder dispensing device, it is provided for a fluidizing device to be provided for the powder reservoir to which the powder dispensing device is fluidly connected or connectable, whereby the control device of the powder dispensing device is designed to set the volume of compressed fluidizing air to be supplied to the fluidizing device per unit of time. It likewise makes sense in this embodiment for the control device to comprise at least one manually actuatable setting element for setting a target value for the volume of compressed fluidizing air to be supplied to the fluidizing device per unit of time.

It can also be provided according to embodiments of the powder dispensing device for the control device to comprise an interface connection for leading out a communication bus of the control device. This serves in setting the at least one parameter via remote control (external control). Alternatively or additionally, the communication bus serves in communicating the at least one set target parameter value to a remote processing unit.

This thereby realizes the advantage of—depending on need—also being able to reach the control device via remote control. Thus, control in automatic mode is in particular also possible, and that even when no manually actuatable setting element and/or optical display unit is provided on the control device itself. Even when these elements are provided, both automatic operation as well as manual control operation can thus advantageously be provided.

The communication bus is advantageously designed as a field bus system. Robust and standardized field bus systems with respect to signaling can in particular be thereby used such as e.g. a CAN bus or Profi-bus in order to enable simple integration into existing automation systems.

The powder dispensing device according to the disclosure is in particular accorded—in contrast to conventional powder dispensing devices known from the prior art—a double function: firstly, the powder dispensing device serves to convey powder coating powder from a powder reservoir to a powder spraying device fluidly connected to the powder dispensing device.

Secondly, however, the powder dispensing device also serves in particular to appropriately control the powder spraying device fluidly connected to the powder dispensing device so as to spray the powder/coating powder conveyed from the powder dispensing device to the powder spraying device onto the object to be coated.

In other words, the solution according to the disclosure in particular achieves the advantage of being able to forgo separately designed electronic control devices such that the entire powder coating system can be of more compact and orderly design. Integrating the control device into the powder dispensing device also eliminates otherwise typically complex wiring, or connection of compressed air lines respectively, as this can preferably be done directly on the compressed air connection of the powder dispensing device.

The control device integrated into the powder dispensing device, or directly connected to the powder dispensing device respectively, preferably serves not only to control a powder spraying device connected to the powder dispensing device but also to set at least some of the parameters which are characteristic with respect to powder conveyance effected by the powder dispensing device. This in particular relates to an amount of powder/coating powder to be conveyed by the powder dispensing device per unit of time, a volume of compressed conveying air to be conveyed with the powder/coating powder per unit of time, etc.

The disclosed powder dispensing device is suitable for automatic spraying devices (automatic guns) and for manual spraying devices (hand guns). Particularly in the case of manual spraying devices, however, the coating quality and the degree of efficiency are highly dependent on the experience of the operator.

Therefore, according to a further development of the disclosed solution, it is provided for the control device integrated into the powder dispensing device to have a memory device comprising a plurality of spray coating programs, and that with not only variable parameters but also unchangeable parameters. The unchangeable parameters are in particular those which are particularly critical to the coating quality and/or the degree of efficiency and require a great deal of experience in terms of precisely setting the parameters, for example the high voltage of high-voltage electrodes for the electrostatic charging of the coating material and preferably also the electrode current. The unchangeable parameters are set to parameter values which have proven to be particularly advantageous in practice.

According to preferential implementations of the powder dispensing device according to the disclosure, the control device of the powder dispensing device is designed as a control module while the dilute phase powder pump of the powder dispensing device is designed as a pump module.

The term “module” is to be understood herein as an exchangeable component of the powder dispensing device as such. In particular, the powder dispensing device is thus preferably of at least partly modular structure; i.e. composed of a plurality of modules.

The disclosed powder dispensing device is in particular characterized by its compact design. The integration of the control device into the powder dispensing device dispenses with complex wiring or different types of connection between a normally externally provided control device and the powder dispensing device. Moreover, the response time and response behavior of the powder dispensing device are improved as there are only very short pneumatic lines for controlling the valves (particularly pinch valves) in the powder dispensing device.

The disclosure in particular enables the powder dispensing device to exhibit compact external dimensions, particularly as regards the width of the powder dispensing device. According to preferential implementations of the powder dispensing device, same has a width of 20 mm to 150 mm and preferably between 30 mm and 100 mm. This allows easily realizing an arrangement of multiple powder dispensing devices directly next to each other on a powder container.

According to embodiments of the disclosed powder dispensing device, the control device designed as a control module comprises a compressed air control with a compressed air connection (central compressed air connection of the powder dispensing device). Compressed air from in particular an (external) compressed air source can be supplied to the compressed air control of the powder dispensing device via the compressed air connection.

The compressed air control has at least one compressed air outlet in order to provide the compressed air required by the dilute phase powder pump of the powder dispensing device for conveying powder/coating powder. The compressed air control is in particular designed to set the volume of the compressed air required by the dilute phase powder pump per unit of time for conveying powder/coating powder provided via the at least one compressed air outlet of the compressed air control.

In this context, it is particularly conceivable for the compressed air control to exhibit a first compressed air outlet for providing transporting or respectively conveying air as required by the dilute phase powder pump of the powder dispensing device for conveying powder/coating powder.

In addition to this first compressed air outlet, the compressed air control preferably exhibits a further (second) compressed air outlet in order to provide supplementary air as required by the dilute phase powder pump of the powder dispensing device for conveying powder/coating powder. In these embodiments, the compressed air control of the powder dispensing device is in particular designed to set the volume of compressed air provided via the first and second compressed air outlet required by the dilute phase powder pump of the powder dispensing device per unit of time for conveying powder/coating powder.

Alternatively or additionally thereto, it is conceivable for the compressed air control to have a compressed air outlet in order to provide the compressed air needed by a powder spraying device for spraying powder/coating powder such as in particular electrode purge air, shaping air and/or compressed conveying air. This compressed air outlet is sometimes also referred to herein as the “third compressed air outlet” even though this compressed air outlet can also be provided without the first and second compressed air outlets.

The compressed air control is preferably designed to set the compressed air (electrode purge air, shaping air, compressed conveying air, etc.) which the powder spraying device needs for spraying powder/coating powder as provided via the third compressed air outlet and as required per unit of time.

In order to set the volume of compressed air to be provided at the corresponding compressed air outlet per unit of time, advantageous embodiments of the powder dispensing device provide for a compressed air throttle device to be allocated to the respective compressed air outlet which preferably comprises at least one throttle valve which is in particular able to be regulated by the control device of the powder dispensing device. This throttle valve can for example be used to set the volume of compressed air to be provided per unit of time via the corresponding compressed air outlet.

As already indicated, preferential implementations of the powder dispensing device provide for the dilute phase powder pump to be designed as a pump module and the control device as a control module. In conjunction hereto, embodiments of the present disclosure provide for the dilute phase powder pump designed as a pump module to comprise a powder-conveying injector having a drive nozzle and a collecting nozzle, wherein the powder-conveying injector exhibits a first compressed air connection via which conveying air can be supplied to the drive nozzle. The powder-conveying injector further exhibits a second compressed air connection via which supplementary air can be supplied to the powder-conveying injector. The first compressed air connection of the pump module is thereby fluidly connected to the first compressed air outlet of the control module while the second compressed air connection of the pump module is fluidly connected to the second compressed air outlet of the control module.

According to embodiments of the present disclosure, the first and second compressed air connection of the pump module are in each case directly connected fluidly to the respective first or second compressed air outlet of the control module. This is then particularly appropriate when the pump module is directly connected (preferably detachably) to the control module.

Alternatively thereto, however, it is also conceivable for the first and second compressed air connection of the pump module to in each case be fluidly connected to the respective first or second compressed air outlet of the pump module via a channel formed in a distributor block. Sensible in this case would be for the pump module to be (preferably detachably) connected to the control module via the distributor block so as to thus form the powder dispensing device.

When a distributor block is used in the powder dispensing device according to the disclosure, it is particularly appropriate for same to exhibit a compressed air outlet fluidly connected to the third compressed air outlet of the control module via a channel formed in the distributor block.

The disclosure relates not only to a powder dispensing device particularly of the above-described type but also to a system consisting of the powder dispensing device and a powder reservoir.

According to a further aspect, the present disclosure further relates to a powder coating system for the powder spray coating of objects, wherein the powder coating system comprises a powder dispensing device of the aforementioned type and at least one powder spraying device connected to the powder dispensing device via a powder supply line. The powder coating system is in particular characterized by all of the parameters which are able to be set with respect to the functioning of the at least one powder spraying device being able to be set by means of the control device of the powder dispensing device. It therefore constitutes a particularly compact system providing a simpler and less expensive spray coating operation for the operator without having to forego good coating quality and good coating efficiency.

According to a further aspect, the present disclosure relates to a system having a powder dispensing device of the aforementioned type as well as a powder reservoir, wherein the powder dispensing device is arranged directly on the powder reservoir and a powder inlet of the powder dispensing device opens into a powder chamber of the powder reservoir via an intake line. For example, the powder reservoir comprises at least one powder container having a powder chamber, wherein a powder dispensing channel is formed in a side wall of the powder container, and wherein the powder inlet of the powder dispensing device is fluidly connected or connectable to the powder dispensing channel via an intake hose connection.

According to this aspect of the present disclosure, the powder dispensing device and in particular the dilute phase powder pump of the powder dispensing device is connected or connectable to the powder dispensing channel which opens into the powder chamber via a powder dispensing opening. A particularly short suction distance thus results, thereby benefiting the adjustability and reproducibility of the powder flow rate. Lastly, the system considerably reduces the space which the system requires.

One preferential development of the system according to the disclosure provides for the powder dispensing channel to be formed in a side wall of the powder container and the powder dispensing device, or dilute phase powder pump of the powder dispensing device respectively, to be connected or connectable to the powder dispensing channel via an intake hose connection.

Providing the powder dispensing channel in the side wall of the powder container can achieve being able to attach the dilute phase powder pump of the powder dispensing device to the powder container at a particularly close distance. The dilute phase powder pump of the powder dispensing device is thereby attached at a particularly short distance from the powder dispensing opening. Accordingly, this fundamentally reduces the lifting work required in order to convey the coating powder through the powder dispensing channel with the aid of the dilute phase powder pump. The short suction distance also has a positive effect on the adjustability and reproducibility of the powder flow rate. The dilute phase powder pump of the powder dispensing device can thereby be connected or connectable to the powder dispensing channel via a separate intake hose connection. It is conceivable that already known powder containers can be retrofit with the disclosed powder dispensing device, or the dilute phase powder pump of the powder dispensing device respectively, by means of the intake hose connection.

In addition, the powder dispensing device can also comprise an intake hose fluidly connected or connectable to a through-hole of the intake hose connection of the powder container. The intake hose is thereby in particular to be designed so as to be insertable into the powder dispensing channel of the powder container.

The inner diameter of the powder dispensing channel can be readily varied by means of the intake hose connected or connectable to the intake hose connection. In particular, the intake hose can thereby have an inner diameter of 5 mm to 8 mm and preferably of approximately 4 mm. Reducing the diameter of the powder dispensing channel via the intake hose can improve the suction performance of the dilute phase powder pump of the powder dispensing device. This is in particular due to the reduced amount of powder within the powder dispensing channel as well as to the slower venting of the powder.

BRIEF DESCRIPTION OF THE DRAWINGS

The following will reference the accompanying drawings in describing exemplary embodiments of the powder dispensing device in greater detail. Shown are.

DETAILED DESCRIPTION

Figure 1:
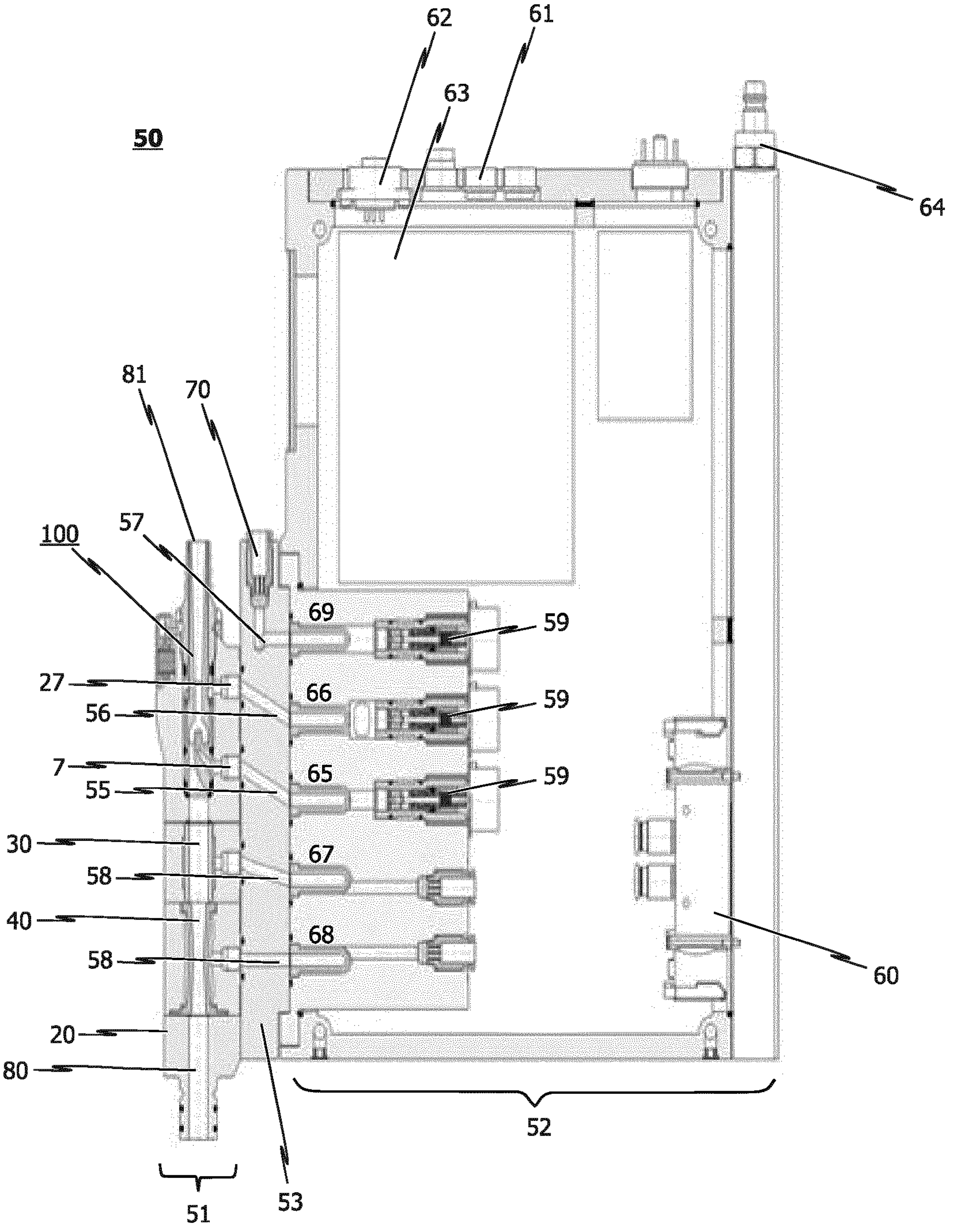
FIG. 1: a schematic sectional view of an exemplary embodiment of the powder dispensing device with a dilute phase powder pump.

FIG. 1 shows a schematic sectional view of a preferential embodiment of the powder dispensing device 50 which comprises a dilute phase powder pump 51 and serves the conveying of powder or coating powder respectively from a powder reservoir (not shown in FIG. 1) to a powder spraying device (likewise not shown in FIG. 1).

The powder spraying device can be a manually operable spray gun or an automatically controllable spraying device. It preferably comprises at least one high-voltage electrode which is supplied with high voltage from a high-voltage source to electrostatically charge the coating powder sprayed by the powder spraying device. The high-voltage source can be integrated into the powder spraying device. The powder spraying device can comprise a spray opening or a rotary atomizer.

A powder reservoir in the sense of the present disclosure preferably comprises at least one powder container having a powder chamber from which powder, coating powder respectively, is extracted via the dilute phase powder pump 51 by means of negative pressure, after which the powder/coating powder flows from the dilute phase powder pump 51 to a corresponding powder spraying device under positive pressure.

The powder container preferably comprises at least one powder outlet opening to which the powder inlet of the powder dispensing device 50 is connected. Particularly conceivable in this context is for the at least one powder outlet opening of the powder container to be arranged in a side wall of the powder container.

The powder chamber of the powder reservoir can be provided with a fluidizing device for fluidizing the coating powder accommodated in the powder chamber of the powder container. The fluidizing device can comprise at least one fluidizing wall of an open-pored material or a material provided with narrow holes which is permeable to compressed air but not, however, powder or coating powder respectively. Particularly advantageous in this context is for the fluidizing wall in the powder container of the powder reservoir to form the bottom of the powder container and be arranged between the powder chamber of the powder container and a fluidizing compressed air chamber. The fluidizing compressed air chamber—as will be described in greater detail in the following—is fluidly connected to a corresponding compressed air source via the powder dispensing device 50 and a compressed air control 60 integrated into the powder dispensing device 50.

An exemplary embodiment of a powder reservoir realized as a powder container in the sense of the present disclosure is for example described in the EP 2 675 574 A2 printed publication.

The exemplary embodiment of the powder dispensing device 50 according to the disclosure, as shown schematically in FIG. 1, is characterized by a modular construction and essentially consists of a control device 52 designed as a control module and a dilute phase powder pump 51 designed as a pump module. These two modules (control module and pump module) are preferably detachably connected to each other in order to form a particularly compact powder dispensing device 50.

As schematically depicted in FIG. 1, the powder dispensing device 50 and in particular the pump module of the powder dispensing device 50 comprises a powder inlet 80 which is fluidly connected or connectable via a powder line (not shown in FIG. 1), particularly an intake hose or the like, to the previously mentioned powder reservoir (likewise not shown in FIG. 1).

A powder outlet 81 is provided at an opposite end region of the powder dispensing device 50, and in particular the pump module of the powder dispensing device 50, which is fluidly connected or connectable via a powder line (not shown in FIG. 1), particularly a powder hose, to a powder inlet of a powder spraying device (a coating gun in particular).

Specifically, in the exemplary embodiment shown in FIG. 1, both the powder inlet 80 of the powder dispensing device 50 as well as the powder outlet 81 of the powder dispensing device 50 are respectively designed as a hose connector to which the corresponding powder line/corresponding powder hose can be attached and fixed by means of e.g. a hose clamp. Of course, other embodiments for the powder inlet 80 or powder outlet 81 respectively of the powder dispensing device 50 and particularly the pump module of the powder dispensing device 50 are also possible.

The powder inlet 80 and the powder outlet 81 preferably lie on a common longitudinal axis L (see FIG. 3) in order to achieve no deflection or only slight deflection of the powder/coating powder to be conveyed within the dilute phase powder pump 51, which considerably reduces the turbulence of the powder/air mixture in the dilute phase powder pump 51.

The pump module of the powder dispensing device 50 according to the embodiment depicted in FIG. 1 comprises a dilute phase powder pump 51 which works according to the injector principle or the Venturi tube principle. The dilute phase powder pump 51 has a powder-conveying injector 100 to that end in which a current of air generates a negative pressure in a negative pressure area formed by channel widening, whereby said negative pressure is used to draw powder, or coating powder respectively, from the powder reservoir via the powder inlet of the pump module/powder dispensing device 50. The withdrawn powder/coating powder is entrained by the current and carried to the powder spraying device. By regulating the airstream's rate of flow, the negative pressure and thus the amount of powder conveyed can be set.

Figure 2:
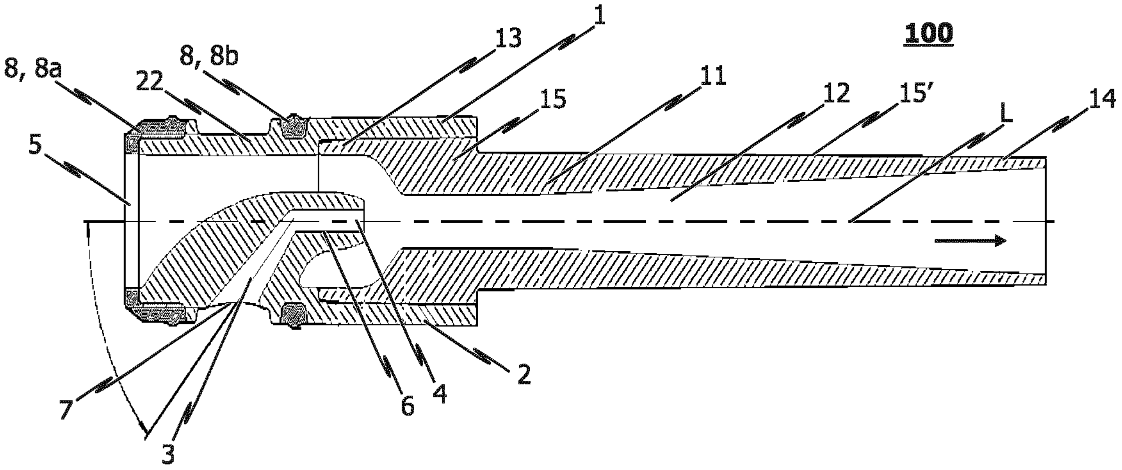
FIG. 2: a schematic sectional view of a powder-conveying injector of the dilute phase powder pump used in the powder dispensing device according to FIG. 1 in disassembled state.
Figure 3:
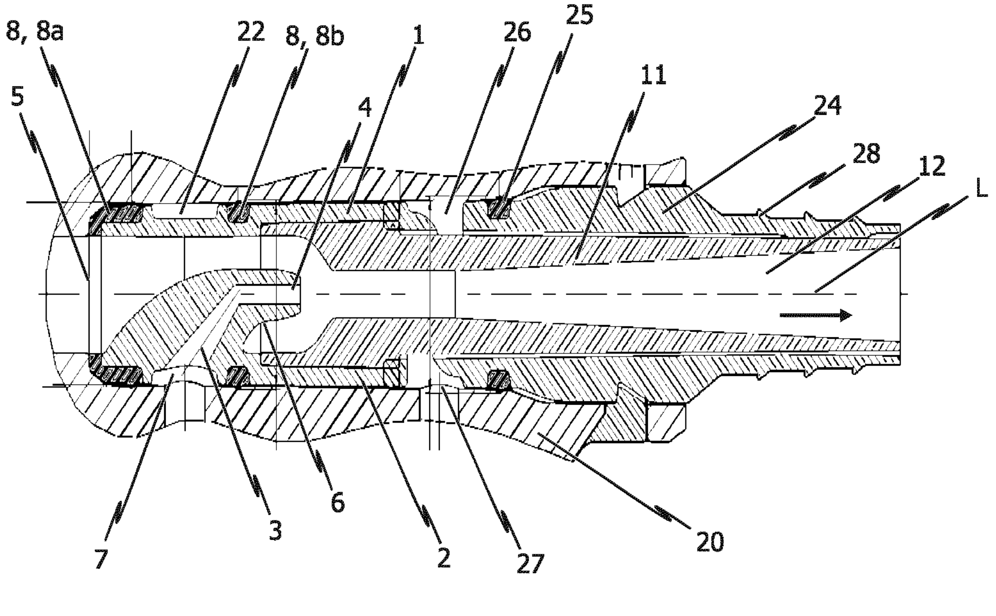
FIG. 3: a schematic sectional view of a powder-conveying injector according to FIG. 2 in its assembled state in a housing of the dilute phase powder pump.

The following will firstly reference the illustrations provided in FIGS. 2 and 3 in describing an exemplary embodiment of a powder-conveying injector 100 suitable for use in the dilute phase powder pump 51 of the powder dispensing device 50 in greater detail.

The exemplary embodiment of the powder-conveying injector 100 exhibits a first region which serves as a drive nozzle 1 and a second region which serves as a collecting nozzle 11. The second region of the powder-conveying injector 100, which serves as a collecting nozzle 11, has a channel with a longitudinal axis L serving as a stream collecting channel 12 in its interior. A mixture of powder/coating powder and conveying air flows through this channel when the powder-conveying injector 100 is for example used in a dilute phase powder pump to convey powder.

The channel, which is also referred to below as the stream collecting channel 12 or the powder flow channel, exhibits a longitudinal axis L, whereby the direction of flow is indicated in FIG. 2 by an arrow. The mixture of powder/coating powder and conveying air to be conveyed enters the second region serving as a collecting nozzle 11 at a funnel-shaped nozzle inlet 13 and exits the collecting nozzle 11 again at a nozzle outlet 14.

At least in the area of the nozzle inlet 13 and the area of the nozzle outlet 14, the second region serving as a collecting nozzle 11 is cylindrical on the outside such that corresponding cylindrical guide surfaces 15, 15' are formed.

The first region of the powder-conveying injector 100 arranged upstream of the second region (collecting nozzle 11) assumes the function of a drive nozzle 1. The first region (drive nozzle 1) essentially consists of a drive nozzle housing 2 having a conveying air duct 3 and a nozzle 4 fluidly connected to the conveying air duct 3, the nozzle opening of which is disposed axially opposite the stream collecting channel 12.

Although not depicted in FIG. 2, it is conceivable for the nozzle 4 or the nozzle opening respectively to be formed by a nozzle tip designed as a metal insert and in particular able to be inseparably connected to the drive nozzle housing 2.

In the powder-conveying injector 100 shown schematically in FIG. 2 in a sectional view, it can be provided for the first region serving as drive nozzle 1 and the second region serving as collecting nozzle 11 to be joined together as one component and inseparably connected to one another. In conjunction hereto, it is in principle conceivable for the first and second region 1, 11 of the powder-conveying injector 100 to be integrally formed from one and the same material, for example as an injection-molded component.

Alternatively thereto, and as schematically indicated in FIG. 2, the first and second region 1, 11 of the powder-conveying injector 100 can also be formed separately, whereby these two regions 1, 11 are then detachably or inseparably connected together, for example by insertion, adhesion or pressing. This would have the advantage of the two regions 1, 11 of the second region 11 of the powder-conveying injector 100 being able to be formed from different materials, particularly different plastic materials.

A further advantage of this embodiment is that the second region 11 of the powder-conveying injector 100, which is of rotationally symmetrical design with respect to the longitudinal axis L of the stream collecting channel 12, can be formed as a turned part. This simplifies in particular the manufacture and assembly of the second region 11 of the powder-conveying injector 100. Furthermore, the second region 11 of the powder-conveying injector 100 can be replaced separately when needed; i.e. without the first region 1 of the powder-conveying injector 100.

The exemplary embodiment of the powder-conveying injector 100, as shown for example schematically in FIG. 2 in a sectional view, is moreover characterized by thereby being a so-called "inline" powder-conveying injector 100, which means that the powder/coating powder to be conveyed via the powder-conveying injector 100 flows axially along the longitudinal axis L of the stream collecting channel 12 through the entire powder-conveying injector 100 (and preferably also through the entire dilute phase powder pump 51).

In particular provided in the exemplary embodiment of the powder-conveying injector 100 is for the first region 1 of the powder-conveying injector 100 to exhibit a powder inlet 5 axially opposite of the nozzle outlet 14 of the second region (collecting nozzle 11) or the powder outlet of the dilute phase powder pump 51 respectively.

What this axial arrangement of the powder inlet 5 and powder outlet 14 can achieve is the powder/coating powder to be conveyed not being deflected or only slightly deflected within the powder-conveying injector 100, which considerably reduces the turbulence of the powder/air mixture in the powder-conveying injector 100.

Moreover, the powder/air mixture is only subject to minimal flow resistance in the powder-conveying injector 100, which overall increases the conveying capacity which the powder-conveying injector 100 is able to achieve with the same volume of conveying air.

Specifically, and as schematically indicated in FIG. 2, the first region of the powder-conveying injector 100, which serves as drive nozzle 1, is of substantially cylindrical construction and exhibits a drive nozzle housing 2 having an essentially cylindrical outer surface. At least some areas of said drive nozzle housing 2 define an interior conveying air duct 3 arranged axially or at least substantially axially with respect to the longitudinal axis L of the stream collecting channel 12. A nozzle projection 6 in which the nozzle opening 4 of the drive nozzle 1 is formed extends into the conveying air duct 3.

The nozzle opening 4 is fluidly connected via the conveying air duct 3 to a conveying air inlet 7 arranged and aligned non-axially with respect to the longitudinal axis L of the channel of the second region 11 serving as stream collecting channel 12. On the other hand—as already stated—the nozzle opening 4 of the drive nozzle 1 is arranged axially with respect to the longitudinal axis L of the stream collecting channel 12.

When the powder-conveying injector 100 is in operation, conveying air is supplied via the conveying air inlet 7 of the drive nozzle 1, said air flowing out toward the stream collecting channel 12 via the nozzle opening 4 of the drive nozzle 1. Due to the nozzle-shaped configuration of at least the upstream region of the stream collecting channel 12, the conveying air is pressed into the collecting nozzle 11 and, because of the relatively small diameter of the nozzle opening 4 of the drive nozzle 1, a high-speed airflow is formed, whereby a negative pressure forms in the area of the powder inlet 5 of the powder-conveying injector 100. As a result of this negative pressure forming in the powder inlet area during the operation of the powder-conveying injector 100, coating powder is drawn in when the powder inlet 5 of the first region 1 of the powder-conveying injector 100 serving as the drive nozzle 1 is fluidly connected to a suitable powder container or the like via a powder channel of the dilute phase powder pump 51 and/or via a powder line, etc.

As indicated schematically in FIG. 2, the drive nozzle housing 2 has a cylindrical inner contour at its downstream end region into which the upstream end region of the second region 11 of the powder-conveying injector 100; i.e. the upstream end region of the area of the powder-conveying injector 100 serving as collecting nozzle, can be inserted and accordingly connected detachably or non-detachably to the drive nozzle housing 2 (for example by clamping, adhesion or pressing).

On the whole, the first and second regions 1, 11 of the powder-conveying injector 100 are thus joined together as one component. These two regions 1, 11, which are joined together as one component have an overall outer contour which is preferably rotationally symmetric with respect to the longitudinal axis L of the stream collecting channel 12. This thereby enables the powder-conveying injector 100 to be inserted into a seating 21 of a housing 20 of the dilute phase powder pump 51 in any given manner without the user needing to pay attention to a specific orientation of the nozzle arrangement 100.

As can further be seen from the schematic sectional view according to FIG. 2, the powder-conveying injector 100 is provided with corresponding seals 8 via which the powder-conveying injector 100 can be sealed vis-á-vis a housing 20 of the dilute phase powder pump 51 when the powder-conveying injector 100 is accommodated in the housing 20 of the dilute phase powder pump 51.

Specifically, it is thereby preferential for at least two circumferential sealing areas 8*a*, 8*b* to be provided, whereby a narrow channel or annular groove 22 is formed between the two circumferential sealing areas 8*a*, 8*b*. The conveying air inlet 7 of the drive nozzle 1 also opens into this area where the narrow channel or annular groove 22 is formed between the two circumferential sealing areas 8*a*, 8*b*.

FIG. 3 shows a schematic and sectional view of the exemplary embodiment of the powder-conveying injector 100 according to FIG. 2 in a state in which the powder-conveying injector 100 is at least partially accommodated in a housing 20 of the dilute phase powder pump 51.

As depicted, the housing 20 of the dilute phase powder pump 51 thereby comprises a seating 21, the size of which is adapted to the outer diameter and outer configuration of at least the upstream end region of the first region (drive nozzle 1) of the powder-conveying injector 100. The sealing rings 8*a*, 8*b* of the powder-conveying injector 100 seal at least the upstream end region of the powder-conveying injector 100 vis-á-vis the wall of the seating 21 provided in the housing 20 of the dilute phase powder pump 51.

To be further seen from the FIG. 3 depiction is that that the narrow channel or annular groove 22 formed between the two circumferential sealing areas 8*a*, 8*b* of the powder-conveying injector 100 forms an annular space with the wall of the seating 21 of the housing 20 of the dilute phase powder pump 51, whereby this annular space is fluidly connected by means of a conveying air connection 23 formed in the housing 20 of the dilute phase powder pump 51.

To be further seen from the FIG. 3 schematic sectional view is that a powder line connection 24 is fit to the downstream end area of the second region of the powder-conveying injector 100 (collecting nozzle 11) and in particular detachably connected to the downstream end area.

To that end, the powder line connection 24 has a receiving channel arranged axially with respect to the longitudinal axis L of the stream collecting channel 12 in which the downstream end region of the collecting nozzle 11 can be at least partially received. Furthermore—as indicated schematically in FIG. 3—the powder line connection 24 can comprise a corresponding seal 25 in order to seal in particular the powder line connection 24 vis-á-vis the housing 20 of the dilute phase powder pump 51.

The powder line connection 24 can be fit to the downstream end region of the collecting nozzle 11 such that an annular space 26 delimited by the housing 20 of the dilute phase powder pump 51, the powder line connection 24 as well as the powder-conveying injector 100 is formed which is fluidly connected to a supplementary air duct 27 formed in the housing 20 of the dilute phase powder pump 51. The supplementary air duct 27 can supply supplementary air to the annular space 27 which can be added to the powder/air mixture conveyed by the powder-conveying injector 100.

Returning to the FIG. 1 depiction, the exemplary embodiment of the powder dispensing device 50 in which a dilute phase powder pump 51 with the powder-conveying injector 100 according to FIG. 2 is used will be described in greater detail in the following.

During the operation of the powder dispensing device 50, conveying air is supplied via the conveying air inlet 7 of the drive nozzle 1 of the powder-conveying injector 100, said air flowing out toward the stream collecting channel 12 via the nozzle opening 4 of the drive nozzle 1. Due to the nozzle-shaped configuration of at least the upstream region of the stream collecting channel 12, the conveying air is pressed into the collecting nozzle 11 and, because of the relatively small diameter of the nozzle opening 4 of the drive nozzle 1, a high-speed airflow is formed, whereby a negative pressure forms in the area of the powder inlet of the powder-conveying injector 100. As a result of this negative pressure forming in the powder inlet area during the operation of the powder dispensing device 50, powder or respectively coating powder is drawn in when the powder inlet of the first region of the powder-conveying injector 100 serving as the drive nozzle 1 is fluidly connected to a suitable powder container or the like via a powder line, etc.

As can further be seen from the schematic sectional view according to FIG. 1, the powder-conveying injector 100 is accommodated in a seating of the dilute phase powder pump 51 realized as a pump module such that the pump module serves as housing 20, or the injector housing respectively, in respect of the powder-conveying injector 100.

Additionally to the above-described powder-conveying injector 100, the dilute phase powder pump 51 of the exemplary embodiment of the powder dispensing device designed as a pump module preferably exhibits a pinch valve 40 which is arranged in a flow path between the powder inlet 80 of the pump module and the powder inlet 5 of the drive nozzle 1 of the powder-conveying injector 100.

Said pinch valve 40 can preferably be controlled by a control device 52, which is part of the powder dispensing device 50 and integrated into the powder dispensing device 50, so as to interrupt a fluidic connection between the powder inlet 80 of the pump module and the powder inlet 5 of the drive nozzle 1 of the powder-conveying injector 100 as needed. Such an interruption of the flow path preferably occurs—as will be described in greater detail below—in a cleaning mode of the pump module of the powder dispensing device 50.

It is moreover conceivable for a compressed air inlet device 30 to be provided between the pinch valve 40 and the powder inlet 5 of the drive nozzle 1 of the powder-conveying injector 100 in order to supply compressed air to the powder-conveying injector 100 when needed. Specifically provided with the exemplary embodiment of the powder dispensing device 50 shown in FIG. 1 is for the compressed air inlet device 30 to be arranged in the flow path between the pinch valve 40 and the powder inlet 5 of the drive nozzle 1 of the powder-conveying injector 100.

The pump module as such comprises a first compressed air connection 7 via which conveying air can be fed to the drive nozzle 1 of the powder-conveying injector 100. The pump module furthermore comprises a second compressed air connection 27 via which supplementary air can be fed to the powder-conveying injector 100.

In addition thereto, the pump module exhibits a third compressed air connection via which compressed air can be fed to the compressed air inlet device 30 as needed and a fourth compressed air connection via which an appropriate control pressure can be furnished to the pinch valve 40 for actuating said pinch valve 40.

The pressures required to operate the dilute phase powder pump 51 designed as a pump module are provided by a corresponding compressed air control 60 of the control device 52 of the powder dispensing device 50 configured as a control module. To that end, the compressed air control 60 of the control device 52 configured as a control module has a (central) compressed air connection 64 via which the compressed air control 60 can be supplied with compressed air from a compressed air source (not shown in FIG. 1).

The compressed air control 60 further comprises a plurality of compressed air outlets 65 to 69 via which is provided the compressed air needed by the dilute phase powder pump 51 to convey powder/coating powder or needed by a powder spraying device connected to the powder dispensing device 50 during a spray coating operation respectively.

As will be explained below, the compressed air control 60 of the control device 52 of the powder dispensing device 50 designed as a control module is particularly designed to regulate the required volume of compressed air provided per unit of time by at least some of the plurality of compressed air outlets 65 to 69 of the control module.

Specifically, and as schematically indicated in FIG. 1, the control device 52 of the powder dispensing device 50 designed as a control module comprises a first compressed air outlet 65 allocated to the compressed air control 60 for supplying conveying air needed by the dilute phase powder pump 51 of the pump module for conveying powder/coating powder.

The control device 52 designed as a control module furthermore comprises a second compressed air outlet 66 allocated to the compressed air control 60 via which is provided the supplementary air needed by the dilute phase powder pump 51 of the pump module to convey powder/coating powder.

In the exemplary embodiment of the powder dispensing device 50 shown in FIG. 1, the control device 52 designed as a control module, or the corresponding compressed air control 60 respectively, has a third compressed air outlet 69 via which the compressed air needed by a powder spraying device connected to the powder dispensing device 50 for spraying powder/coating powder is provided. This compressed air is in particular electrode purge air, shaping air, compressed conveying air, etc.

It is thereby provided for the compressed air control 60 of the control device 52 of the exemplary embodiment of the powder dispensing device 50 designed as a control module to be designed to accordingly regulate the volume of compressed air to be provided at the first, second and third compressed air outlets 65, 66, 69 of the control module per unit of time.

Each of the corresponding compressed air outlets 65, 66, 69 of the control module are to that end allocated a compressed air throttle device 59, each of which has at least one throttle valve able to be regulated in particular by the control device 52 of the powder dispensing device 50. The volume of compressed air to be provided per unit of time via the corresponding compressed air outlet of the control module can then be regulated via this throttle valve.

The use of such compressed air throttle devices 59, respectively throttle valves, in the powder dispensing device 50 is particularly advantageous because in order to obtain good coating quality and good efficiency in terms of the amount of powder/coating powder required, it is particularly important to be able to precisely regulate the required flows of compressed air, thus in minute small steps or steplessly and thereby continuously.

The compressed air throttle devices 59 allocated to the first, second and third compressed air outlets 65, 66, 69 of the control device designed as a control module each comprise a throttle valve and a controllable electric motor having a motor shaft for adjusting the throttle valve. The motor can be any type of motor which has a motor shaft able to be controllably adjusted to defined rotational angle positions, preferably an electric step motor.

As indicated in FIG. 1, the third compressed air outlet 69 of the control device 52 designed as a control module is not (fluidly) connected to the pump module but rather opens into a compressed air outlet 70 of a distributor block 53, wherein this compressed air outlet 70 of the distributor block 53 is fluidly connected to the third compressed air outlet 69 of the control module via a channel 57 formed in the distributor block 53.

The other compressed air outlets of the control module; i.e. the first, second, fourth and fifth compressed air outlets 65 to 68, are fluidly connected to corresponding compressed air inlets of the pump module. Corresponding channels 55, 56, 58 formed in the aforementioned distributor block 53 are used to that end in the embodiment of the powder dispensing device 50 depicted schematically in FIG. 1.

The distributor block 53 is not only accorded the task of fluidly connecting the respective compressed air outlets of the control module to the corresponding compressed air connections of the pump module but also correspondingly connecting the pump module to the control module. The distributor block 53, which can for example be a one-piece block of material in which all the channels required to supply the pump module with compressed air are formed, provides interfaces which are in particular optimized with respect to the pump module on the one hand and with respect to the control module on the other hand so as to prevent any sealing problems between the channels of the distributor block 53 and compressed air outlets of the control module or compressed air inlets of the pump module respectively.

Furthermore, the channels formed in the distributor block 53 are designed to be as short as possible and represent the smallest possible volumes needing to either be evacuated or filled with compressed air during the operation of the pump module. This thereby shortens the pump module's response delay and can achieve an increased response time.

However, it is of course also conceivable for the pump module and the control module to be connected directly to each other when the compressed air outlets of the control module can be directly connected to the corresponding compressed air inlets of the pump module.

The control device 52 of the powder dispensing device 50 designed as a control module is integrated into the powder dispensing device 50 in order to achieve the most compact possible structure of the powder dispensing device 50. In particular, the powder dispensing device 50 advantageously has a modular structure in which the "dilute phase powder pump 51" and "control device 52" components are each designed as a modular component, whereby these two modular components are connected together by means of the likewise modularly structured distributor block. The pump module itself can have a modular structure consisting of e.g. the individual "powder inlet 80," "pinch valve 40," "compressed air inlet device 30" and "powder-conveying injector 100" modules.

The control device 52 associated with the control module not only serves to set and regulate, or respectively control, at least one parameter which is characteristic with respect to a spray coating operation process effected with a powder spraying device connected to the powder dispensing device 50 and/or at least one parameter which is characteristic with respect to the powder conveyance effected with the dilute phase powder pump 51 of the pump module but also to regulate the corresponding electrical variables.

To that end, the control device 52 exhibits a corresponding electrical connection and electrical control (main board). The control device 52 is furthermore allocated an interface connection 62 for leading out a communication bus of the control device 52 which is designed to regulate at least one parameter by means of remote control and/or communicate at least one set target parameter value to a remote processing unit. The interface connection can for example exhibit a parallel or serial interface.

A powder spraying device connected to the powder dispensing device 50 can further be supplied with electrical control signals or electrical energy respectively via the interface connection 62.

The control device 52 is in particular designed to set at least one of the parameters listed below and characterizing a spray coating operation effected in respect of the powder spraying device:

- an electrode spray current of one or more high-voltage electrodes of the powder spraying device;
- a high voltage on one or more high-voltage electrodes of the powder spraying device;
- a volume of electrode purge air to be supplied to the powder spraying device per unit of time;
- a volume of shaping air to be supplied to the powder spraying device per unit of time.

Alternatively or additionally, the control device 52 is designed to set at least one of the parameters listed below and characterizing a powder conveyance effected in respect of the powder dispensing device 50:

- an amount of powder/coating powder to be conveyed by the powder dispensing device 50 per unit of time;
- a volume of compressed conveying air to be conveyed together with the powder/coating powder per unit of time.

Although not depicted in FIG. 1, it is conceivable in this context for the control device 52 to comprise at least one manually actuatable parameter setting element 61 for setting a target parameter value for the at least one parameter which is characteristic with respect to a spray coating process effected with the powder spraying device or characteristic with respect to powder conveyance effected with the powder dispensing device 50 respectively. It is nevertheless further conceivable in this context for the control device 52 to have an optical display unit for displaying the at least one set target parameter value and/or for displaying a corresponding actual parameter value.

It is moreover conceivable for the control device 52 to be designed to effect spray coating procedures, wherein the control device 52 comprises a memory device 63 having a plurality of spray coating programs to that end, wherein each spray coating program contains at least one respective adjustable parameter, wherein the control device 52 has at least one manually actuatable parameter setting element for setting a target parameter value of the at least one adjustable parameter, and wherein the control device 52 has an optical display unit for automatically displaying the at least one set target parameter value.

The control device 52 can furthermore be designed to perform a cleaning (flushing) of the pump module, preferably automatically, which is for example necessary upon changing powder. It is conceivable to that end for the control module to exert a corresponding actuating pressure on the pinch valve 40 of the pump module via the fifth compressed air outlet so as to close the pinch valve 40. Purge air can then be supplied to the compressed air inlet device 30 of the pump module via the fourth compressed air outlet in order to then flush the powder injector of the pump unit as well as the line system to a powder spraying device fluidly connected to the pump unit of the powder dispensing device 50. Simultaneously or in parallel thereto, compressed air can also be supplied to the pump module via the first and second compressed air outlet.

Figure 4:
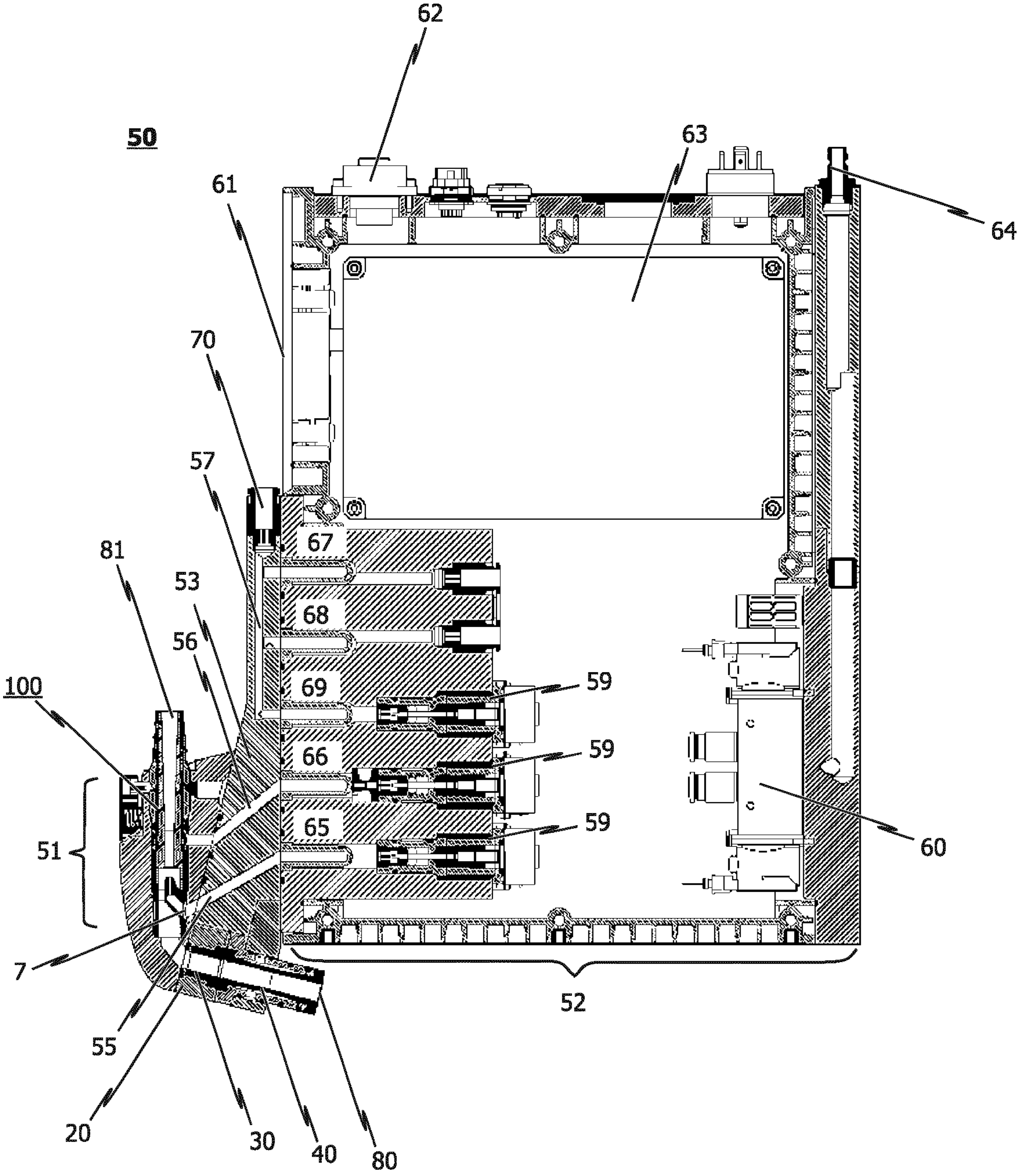
FIG. 4: a schematic sectional view of a further exemplary embodiment of the powder dispensing device with a dilute phase powder pump.
Figure 5:
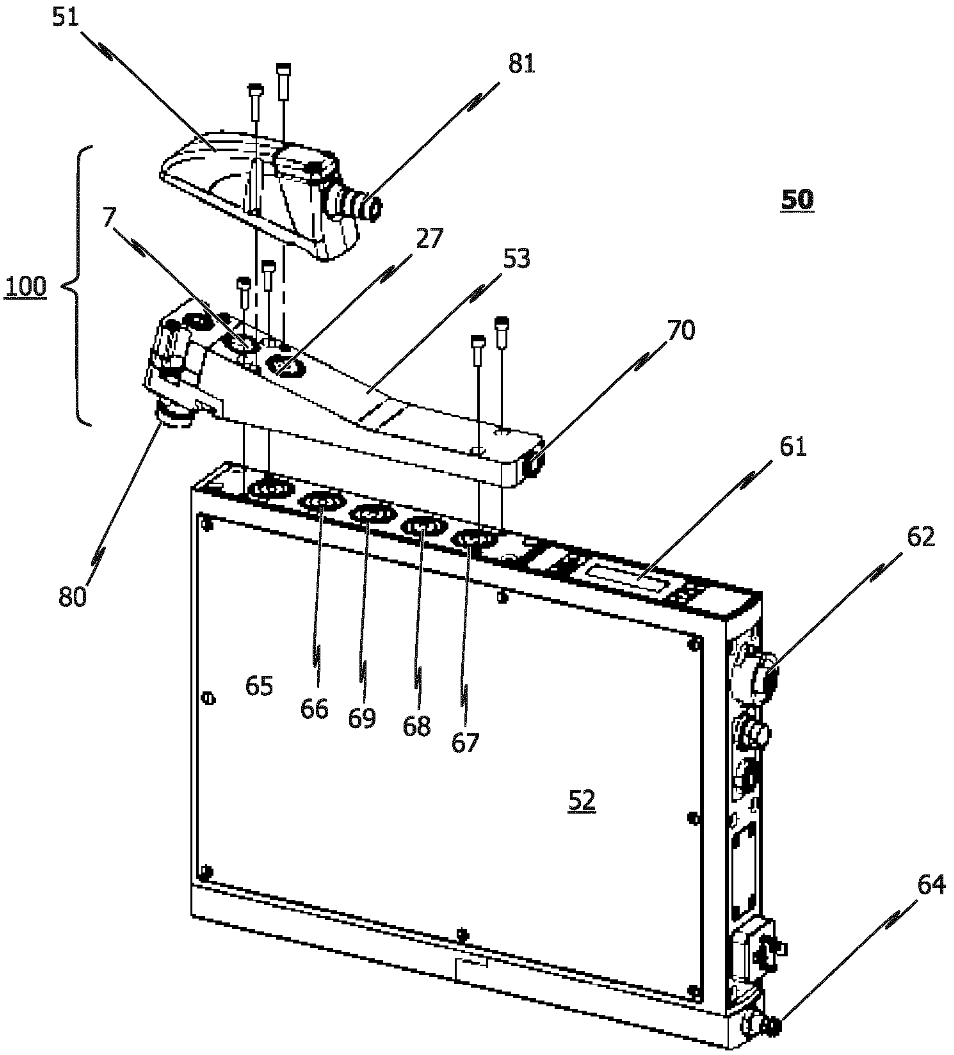
FIG. 5: a schematic exploded view of the exemplary embodiment of the powder dispensing device according to FIG. 4.

The following will reference the illustrations provided in FIG. 4 and FIG. 5 in describing a further exemplary embodiment of the powder dispensing device 50.

Briefly summarized, the exemplary embodiment of the powder dispensing device 50 exhibits a configuration which in principle corresponds to the configuration of the powder dispensing device 50 described above with reference to the FIGS. 1 to 3 illustrations.

Thus, the further exemplary embodiment of the powder dispensing device 50 comprises a dilute phase powder pump 51 in order to pump powder, in particular coating powder, from a powder reservoir to a powder spraying device.

Further provided is a control device 52 integrated into the powder dispensing device 50 designed so as to be able to set at least one parameter which is characteristic with respect to a spray coating process effected with the powder spraying device and/or characteristic with respect to powder conveyance effected with the dilute phase powder pump 51.

It is also provided in the further exemplary embodiment of the powder dispensing device 50 for the control device 52 to form a structural unit with the dilute phase powder pump 51.

The control device 52 of the further exemplary embodiment of the dispensing device 50 corresponds in structural and functional terms to the control device 52 described above with reference to the illustrations in FIGS. 1 to 3. To avoid repetition, reference is thus made at this point to the previous remarks.

In the further exemplary embodiment of the powder dispensing device 50 according to FIG. 4 and according to FIG. 5, a dilute phase powder pump which exhibits a more compact structure—compared to the embodiment according to FIGS. 1 to 3—is used as dilute phase powder pump 51.

A powder-conveying injector 100 as has been at least in principle described with reference to the illustrations in FIGS. 2 and 3 is to that end used in the dilute phase powder pump 51 according to FIG. 4 and FIG. 5.

Although provided in the embodiment according to FIGS. 4 and 5 is for the powder supply channel, which is fluidly connected to a powder container (or hopper), to be slightly angled with respect to the conveying axis. The powder supply channel can in this way be of relatively short design, which overall optimizes the response behavior of the dilute phase powder pump.

Specifically provided in the exemplary embodiment shown in FIG. 4 and FIG. 5 is for the powder supply channel of the powder-conveying injector to already be formed as part of a powder dispensing or respectively powder intake channel of a powder container or to respectively be able to be fluidly connected directly to same. A pinch valve 40 is again provided in the powder supply channel and a compressed air inlet device 30 is provided between the pinch valve 40 and the powder inlet 5 of the drive nozzle 1 of the powder-conveying injector 100.

As regards the advantages able to be achieved with pinch valve 40 and compressed air inlet device 30, reference is made to the previous embodiments relative to the exemplary embodiment of the powder dispensing device 50 shown in FIG. 1.

Figure 6:
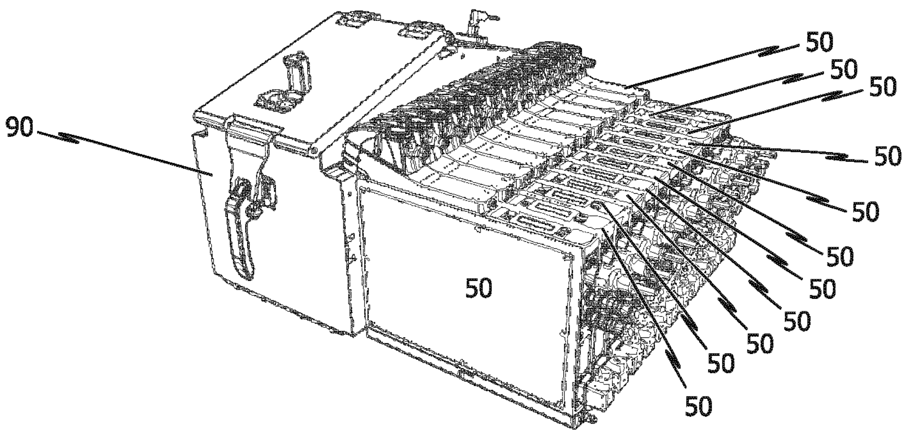
FIG. 6: a schematic and isometric view of an exemplary embodiment of the system according to the disclosure having a plurality of powder dispensing devices according to FIG. 4 and a powder container as a powder reservoir.
Figure 7:
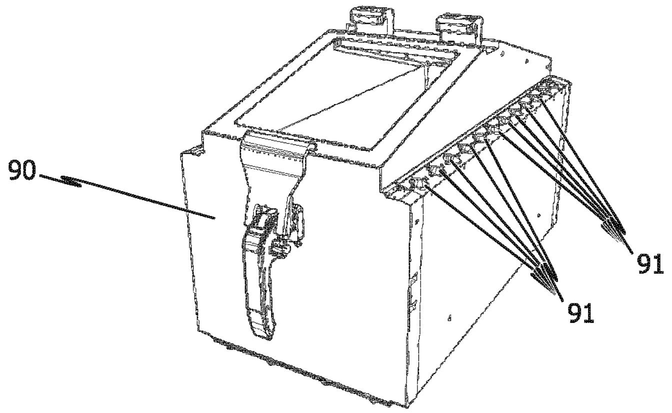
FIG. 7: the powder container of the system according to FIG. 6 without powder dispensers and without a container lid.

FIG. 6 shows a schematic and isometric view of an exemplary embodiment of the system consisting of a plurality of powder dispensing devices 50 according to the second exemplary embodiment (see FIG. 4) and a powder reservoir. The powder reservoir is a powder container 90 with corresponding powder dispensing openings 91 provided in its chamber walls. It is thereby provided for each of the powder dispensing openings 91 to be fluidly connected or connectable to the powder inlet 80 of the dilute phase powder pump 51 of the powder dispensing device 50 realized as a pump module so that coating powder can be extracted from the powder chamber of the powder container 90 and supplied to the respective spraying device during a powder coating operation of a powder coating system.

The powder dispensing openings in the chamber walls of the powder container 90 which open into the powder chamber preferably exhibit an elliptical shape so that the effective area for suctioning (fluidized) coating powder is enlarged.

The powder dispensing openings are arranged as deep as possible in the powder chamber so that the powder dispensing devices 50 will be able to extract preferably all of the coating powder from the powder chamber. The dilute phase powder pumps 51 of the powder dispensing devices 50 are preferably situated at a point which is higher than the highest powder level and are each connected to one of the powder dispensing openings which opens into the powder chamber by a powder dispensing or powder intake channel respectively. Having the dilute phase powder pumps 51 of the powder dispensing devices 50 be arranged higher than the maximum powder level prevents the coating powder rising from the powder chamber into the dilute phase powder pumps 51 when they are not switched on.

As depicted in FIG. 6, the exemplary embodiment is a closed powder container 90, or respectively one able to be closed with a lid, wherein the lid is preferably connectable to the powder container 90 via a quick-release connection.

Specifically provided in the powder container 90 according to FIG. 6 is for virtually the entire upper top wall of the powder container 90 to be removable in order to open the powder container 90.

The powder container 90 preferably comprises an essentially cube-shaped powder chamber for accommodating coating powder. At least one compressed purge air inlet can be provided in a side wall of the powder container 90 to which a compressed air source can be connected via a compressed air line in order to introduce compressed purge air into the powder chamber during a cleaning operation of the system to remove residual powder from the powder chamber.

Further provided on the side wall of the powder container 90 can be a residual powder outlet having an outlet opening via which residual powder can be expelled from the powder chamber with the help of the compressed purge air introduced into the powder chamber during the cleaning operation of the system.

A fluidizing device for introducing compressed fluidizing air into the powder chamber of the powder container 90 is preferably provided in the embodiment depicted in FIG. 6. The compressed fluidizing air can be introduced into the powder chamber through an end wall, side wall, bottom wall or top wall. Advantageously, however, the bottom wall of the powder chamber is designed as a fluidizing bed. It can comprise a plurality of open pores or small through-openings through which compressed fluidizing air can flow upward from a fluidizing compressed air chamber arranged beneath the bottom wall into the powder chamber in order to put the coating powder therein into a suspended state (fluidize it) during the powder coating operation so that the powder-dispensing devices 50 can easily extract it. The compressed fluidizing air is supplied to the fluidizing compressed air chamber through a fluidizing compressed air inlet.

So that the pressure within the powder chamber does not exceed a predefined maximum pressure when the fluidizing device is in operation, the powder chamber preferably comprises at least one fluidizing compressed air outlet having an outlet opening for discharging the compressed fluidizing air introduced into the powder chamber and for effecting pressure equalization. The outlet opening of the at least one fluidizing compressed air outlet is particularly to be dimensioned such that a maximum overpressure of 0.5 bar compared to atmospheric pressure prevails in the powder chamber during the operation of the fluidizing device.

Further preferential is for the powder container 90 to comprise at least one level sensor so as to be able to detect the maximum permissible powder level in the powder chamber.

For example, the level sensor can detect a maximum, a minimum or any given powder level in the powder chamber.

Also conceivable is the providing of a further level sensor arranged with respect to the powder container so as to detect a minimum powder level and emit a corresponding message to a control unit and preferably to at least one control device 52 integrated in the respective powder dispensing devices 50 immediately upon the reaching or dropping below of said minimum powder level in order for fresh powder or recovered powder to be supplied, preferably automatically, to the powder chamber via the inlet opening of at least one powder inlet.

The invention is not limited to the exemplary embodiments depicted in the drawings but rather yields from an integrated overall consideration of all the features disclosed herein.

The invention claimed is:

1. A powder dispensing device comprising:

a dilute phase powder pump for conveying powder from a powder reservoir to a powder spraying device; and a control device integrated into the powder dispensing device, configured to set at least one parameter which is characterizing with respect to a spray coating process effected with the powder spraying device and/or with respect to powder conveyance effected with the dilute phase powder pump, wherein the control device forms a structural unit with the dilute phase powder pump, wherein the control device is realized as a control module and comprises a compressed air control with a central compressed air connection via which compressed air can be supplied to the compressed air control from an external compressed air source, wherein the compressed air control has at least one compressed air outlet for providing the compressed air used by the dilute phase powder pump for conveying powder, and wherein the compressed air control is configured to be adjusted by setting of a target powder conveying parameter by at least one of the group consisting of: a manually actuatable parameter setting element; external control signals provided on a communication bus of the control device; and a memory device storing a plurality of spray coating programs each having at least one respective adjustable parameter, to set a volume of compressed air provided via the at least one compressed air outlet per unit of time for conveying powder, wherein the at least one compressed air outlet of the compressed air control comprises a first compressed air outlet for providing conveying air used by the dilute phase powder pump for conveying powder and a second compressed air outlet for providing supplementary air used by the dilute phase powder pump for conveying powder, wherein the compressed air control is configured to set volumes of the conveying air/supplementary air provided via the first and second compressed air outlet by the dilute phase powder pump per unit of time for conveying the powder, wherein the dilute phase powder pump is realized as a pump module and comprises a powder-conveying injector having a drive nozzle and a collecting nozzle, wherein the collecting nozzle of the powder-conveying injector includes a collecting channel distanced axially opposite the drive nozzle of the powder-conveying injector, wherein the powder-conveying injector includes a first compressed air connection via which the conveying air can be supplied to the drive nozzle and a second compressed air connection via which the supplementary air can be supplied to the powder-conveying injector, wherein the first compressed air connection is fluidly connected to the first compressed air outlet of the control device realized as a control module and the second compressed air connection is fluidly connected to the second compressed air outlet of the control device realized as a control module, wherein the dilute phase powder pump realized as a pump module comprises a powder inlet via which the powder from the powder reservoir can be supplied to the dilute phase powder pump realized as a pump module, and wherein the dilute phase powder pump realized as a pump module comprises at least one pinch valve which is actuatable by the control device which is arranged in a flow path between the powder inlet of the dilute phase powder pump realized as a pump module and a powder inlet of the drive nozzle for selectively interrupting a fluidic connection between the powder inlet of the dilute phase powder pump realized as a pump module and the powder inlet of the drive nozzle, and wherein the dilute phase powder pump realized as a pump module has a compressed air inlet device via which compressed air can be supplied to the powder inlet of the drive nozzle of the powder-conveying injector, wherein the compressed air inlet device is arranged in a flow path between the at least one pinch valve and the powder inlet of the drive nozzle of the powder-conveying injector.

2. The powder dispensing device according to claim 1, wherein the control device is configured to set at least one of the parameters listed below and characterizing a spray coating operation effected in respect of the powder spraying device:

an electrode spray current of one or more high-voltage electrodes of the powder spraying device;

a voltage on one or more high-voltage electrodes of the powder spraying device;

a volume of electrode purge air to be supplied to the powder spraying device per unit of time; and a volume of shaping air to be supplied to the powder spraying device per unit of time;

and/or wherein the control device is configured to set at least one of the parameters listed below and characterizing a powder conveyance effected in respect of the powder dispensing device:

an amount of powder to be conveyed by the powder dispensing device per unit of time; and a volume of compressed conveying air to be conveyed together with the powder per unit of time.

3. The powder dispensing device according to claim 2, wherein the control device comprises the at least one manually actuatable parameter setting element for setting a target parameter value for the at least one parameter which is characteristic with respect to a spray coating process effected with the powder spraying device and/or with respect to powder conveyance effected with the powder dispensing device.

4. The powder dispensing device according to claim 3, wherein the control device comprises an optical display unit for displaying the at least one set target parameter value and/or for displaying a corresponding actual parameter value.

5. The powder dispensing device according to claim 1, wherein the powder reservoir is provided with a fluidizing device, and wherein the control device is further configured to set a volume of compressed fluidizing air to be supplied to the fluidizing device per unit of time, and wherein the control device in particular comprises the at least one manually actuatable parameter setting element for setting a target value for the volume of compressed fluidizing air to be supplied to the fluidizing device per unit of time.

6. The powder dispensing device according to claim 3, wherein the control device comprises an interface connection for leading out the communication bus of the control device configured to set the at least one parameter via remote control and/or to communicate the at least one set target parameter value to the processing unit.

7. The powder dispensing device according to claim 6, wherein the interface connection has a parallel or serial interface and/or wherein the communication bus is configured as a field bus system.

8. The powder dispensing device according to claim 1, wherein the control device configured to effect spray coating procedures, wherein the control device comprises the memory device storing the plurality of spray coating programs that contain at least one respective adjustable parameter, wherein the control device has the at least one manually actuatable parameter setting element for setting a target parameter value of the at least one adjustable parameter, and wherein the control device in particular further comprises an optical display unit for automatically displaying the at least one set target parameter value.

9. The powder dispensing device according to claim 1, wherein the compressed air control has a third compressed air outlet for providing compressed air for spraying powder as electrode purge air, shaping air and/or compressed conveying air, wherein the compressed air control is configured to set the volume of the compressed air provided via the third compressed air outlet per unit of time for spraying powder.

10. The powder dispensing device according to claim 1, wherein the at least one compressed air outlet is allocated a compressed air throttle device having at least one throttle valve which is able to be regulated by the control device, by means of which the volume of compressed air to be provided per unit of time via the at least one compressed air outlet can be set.

11. The powder dispensing device according to claim 1, wherein the first and second compressed air connection of the dilute phase powder pump realized as a pump module are in each case directly connected fluidly to the respective first or second compressed air outlet of the control device realized as a control module, and wherein the dilute phase powder pump realized as a pump module is directly connected to the control device realized as a control module.

12. The powder dispensing device according to claim 1, wherein the first and second compressed air connection of the dilute phase powder pump realized as a pump module are in each case fluidly connected to the respective first or second compressed air outlet of the control device realized as a control module via a channel formed in a distributor block, and wherein the dilute phase powder pump realized as a pump module is connected to the control device realized as a control module via the distributor block.

13. The powder dispensing device according to claim 9, wherein the first and second compressed air connection of the dilute phase powder pump realized as a pump module are in each case fluidly connected to the respective first or second compressed air outlet of the control device realized as a control module via a channel formed in a distributor block, and wherein the dilute phase powder pump realized as a pump module is connected to the control device realized as a control module via the distributor block, and wherein the distributor block has a compressed air outlet which is fluidly connected to the third compressed air outlet of the control device realized as a control module via a further channel formed in the distributor block.

14. The powder dispensing device according to claim 1, wherein the at least one pinch valve of the dilute phase powder pump realized as a pump module can be pneumatically actuated by means of compressed air provided by the compressed air control.

15. The powder dispensing device according to claim 1, wherein the powder inlet of the drive nozzle of the powder-conveying injector is distanced axially opposite from the collecting channel of the powder-conveying injector.

16. The powder dispensing device according to claim 15, wherein the powder inlet of the drive nozzle is distanced axially opposite from the collecting channel and is aligned with respect to an axis which coincides with a longitudinal axis defined by the collecting channel or runs parallel to a longitudinal axis defined by the collecting channel.

17. The powder dispensing device according to claim 1, wherein a width of the powder dispensing device is in a range of from 20 mm to 150 mm.

18. A system having a powder dispensing device according to claim 1 and a powder reservoir, wherein the powder dispensing device is arranged directly on the powder reservoir and a powder inlet of the powder dispensing device opens into a powder chamber of the powder reservoir via an intake line.

19. The system according to claim 18, wherein the powder reservoir comprises at least one powder container having a powder chamber for powder, wherein a powder dispensing channel is formed in a side wall of the powder container, and wherein the powder inlet of the powder dispensing device is fluidly connected or connectable to the powder dispensing channel via an intake hose connection.

* * * * *